Dec. 3, 1940.   H. C. SWIFT   2,223,583
BRAKE
Filed Aug. 12, 1939

INVENTOR.
HARVEY C. SWIFT
BY *C. H. Fowler*
ATTORNEY.

Patented Dec. 3, 1940

2,223,583

UNITED STATES PATENT OFFICE 2,223,583

BRAKE

Harvey C. Swift, Detroit, Mich., assignor to Hydraulic Brake Company, Detroit, Mich., a corporation of California Application August 12, 1939, Serial No. 289,876

6 Claims. (Cl. 188—78)

This invention relates to brakes for motor vehicles.

An object of this invention is to provide a brake including a primary or forward braking shoe operative to transmit force to a secondary or reverse braking shoe so as to actuate the latter with increased effectiveness.

Another object of the invention is to provide a brake including a braking shoe operative to transmit force to another braking shoe so anchored as to swing the articulate end thereof into the drum with increased force.

Another object of the invention is to provide a brake structure including a primary braking shoe and a secondary braking shoe, and means for automatically adjusting the articulate end of the reverse braking shoe.

A further object of the invention is to provide a brake structure including a primary braking shoe connected to a secondary braking shoe, a link connecting the secondary shoe to an anchor, and means for frictionally resisting movement of the link.

A feature of the invention is a link pivotally mounted on an anchor and frictionally held against movement, and a braking element pivotally connected to the link.

Other objects and features of the invention will appear from the following description taken in connection with the drawing forming a part of this specification, and in which—

Figure 1:
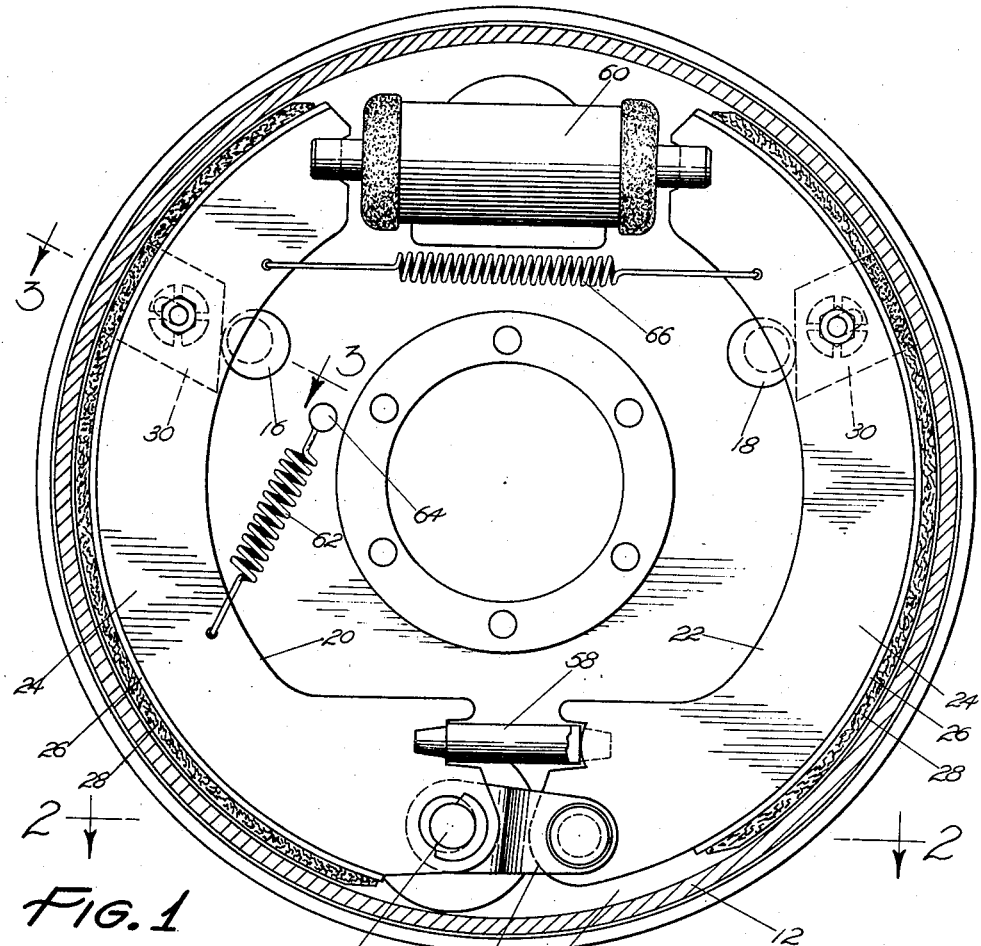
Fig. 1 is a vertical sectional view of a brake embodying the invention.
Figure 2:
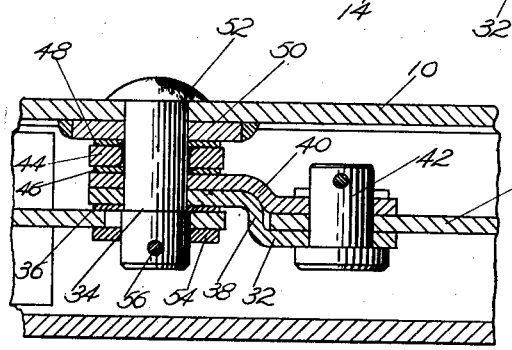
Fig. 2 is a sectional view, substantially on line 2—2, Fig. 1.
Figure 3:
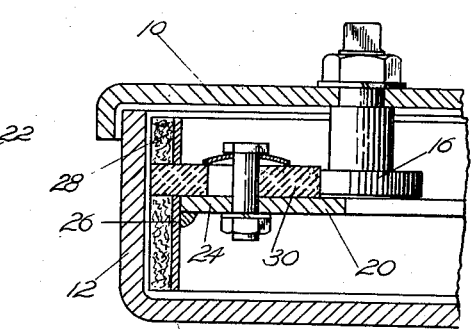
Fig. 3 is a sectional view, substantially on line 3—3, Fig. 1.

Referring to the drawing for more specific details of the invention, 10 represents a fixed support or backing plate adapted to be secured to an axle or to an axle housing, and associated with the backing plate is a rotatable drum 12 adapted to be secured to a wheel.

The backing plate has arranged thereon an anchor 14, adjustable retractile stops 16 and 18, and a friction element for cooperation with the drum. The friction element includes a primary or forward braking shoe 20 and a secondary or reverse braking shoe 22. Each of the braking shoes includes a web 24 supporting a rim 26 having secured thereto a friction lining 28 for engagement with the drum, and supported on the web 24 of each of the braking shoes is an automatic adjuster 30 adapted to cooperate with the drum and an adjacent retractile stop for supporting the shoes in proper spaced relation to the drum when the braking shoes are in retracted position.

The primary or forward braking shoe 20 is shiftably mounted on the anchor 14, and the secondary or reverse braking shoe is pivotally connected to a link 32 frictionally clamped to the anchor. As shown, the anchor has an annular shoulder 34, and a washer 36 sleeved on the anchor abuts this shoulder. The link 32 is composed of two straps 38 and 40 flapped against one another. At one end the straps are offset and spaced apart for the reception of the web 24 of the reverse braking shoe 22, and the offset portions of the straps and the web of the braking shoe are bored for the reception of a pivot pin 42.

The other end of the straps is bored for the reception of the anchor in abutting relation to the washer 36. A split spring-washer 44, interposed between corresponding spacers 46 and 48, is sleeved on the anchor between the adjacent strap of the link 32 and a reinforcing plate 50 suitably secured to the backing plate 10.

The anchor extends through this reinforcing plate and backing plate, and is riveted on the outside of the backing plate as indicated at 52 so as to frictionally clamp the link 32. The free end of the anchor is received by an opening in the web 24 of the forward braking shoe 20, and a washer 54 sleeved on the anchor is held against the web of the shoe by a pin 56 extending diametrically through the anchor.

The braking shoes 20 and 22 are connected adjacent their articulate ends by a thrust member 58, and a fluid pressure actuated motor 60 suitably mounted on the backing plate 10 is connected to the force-applying ends of the shoes. The shoe 20 is connected by a spring 62 to a fixed support 64. This spring serves to normally hold the shoe 20 against the anchor 14, and the shoes 20 and 22 are connected adjacent their force-applying ends by a retractile spring 66.

In a normal operation of the brakes, upon actuation of the motor 60, the shoes 20 and 22 are moved from their retracted positions on the stops 16 and 18 into engagement with the drum 10. Due to friction introduced between the drum 10 and the lining 28 of the forward braking shoe, this shoe moves from its normal position on the anchor 14 and transmits force through the thrust member 58 to the articulate end of the reverse braking shoe 22. This causes the link 32 to swing on the anchor 14 against the friction resistance imposed by the spring-washer 44, and this swinging moment of the link results in movement of the articulate end of the shoe against the drum with increased force.

In a reverse braking operation, upon actuation of the motor 60, the shoes 20 and 22 are moved into drum engagement against resistance of the retractile springs 62 and 66. In this operation the reverse braking shoe 22 becomes the forward braking shoe and the forward braking shoe 20 becomes the reverse braking shoe. Due to friction between the shoe 22 and the rotating drum 12, the shoe has a slight circumferential movement causing a turning moment of the link 32 and resulting in wedging the articulate end of the shoe against the drum. The shoe 20 does not move from the anchor 14, but swings thereon into engagement with the drum.

Upon conclusion of a braking operation and release of pressure on the fluid in the motor 60, the braking shoes are returned to their retracted positions against the stops 16 and 18 under the influence of the retractile springs 62 and 66. During this operation the link 32 is frictionally held against movement, and, accordingly, supports the articulate end of the reverse braking shoe in proper adjusted relation to the drum, such adjustment being proportionate to the wear on that portion of the lining of the shoe 22 adjacent the articulate end thereof.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a rotatable drum associated therewith, a pair of friction elements for cooperation with the drum, a thrust member connecting the elements, an anchor on the support, a link connecting one of the elements to the anchor, the other element anchoring through the thrust member, and means for actuating the elements.

2. A brake comprising a fixed support, a rotatable drum associated therewith, a pair of friction elements for cooperation with the drum, a thrust member connecting the elements, an anchor on the support, a link pivoted to one of the elements and to the anchor, the other element anchoring through the link on the first-mentioned element, means on the anchor for frictionally clamping the link, and means for actuating the elements.

3. A brake comprising a fixed support, a rotatable drum associated therewith, an anchor on the support, a forward braking shoe shiftably mounted on the anchor, a link pivoted on the anchor, means resisting movement of the link, a reverse braking shoe pivoted to the link, a thrust member connecting the braking shoes, and means for actuating the braking shoes.

4. A brake comprising a fixed support, a rotatable drum associated therewith, an anchor on the support, a forward braking shoe shiftable on the anchor, a link pivoted on the anchor, means on the anchor for frictionally clamping the link, a reverse braking shoe pivoted to the link, a thrust member connecting the braking shoes adjacent the anchor, and means for actuating the braking shoes.

5. A brake comprising a fixed support, a rotatable drum associated therewith, a fixed anchor on the support, a link pivoted on the anchor, a spring-pressed washer on the anchor for frictionally resisting movement of the link, a forward braking shoe shiftable on the anchor, a reverse braking shoe pivoted to the link, a thrust member connecting the braking shoes, and means for actuating the shoes.

6. A brake comprising a fixed support, a rotatable drum associated therewith, a fixed anchor on the support, a link pivoted on the anchor, means on the anchor frictionally resisting movement of the link, a forward braking shoe shiftable on the anchor, a reverse braking shoe pivoted on the link, means for transmitting force from the forward braking shoe to the reverse braking shoe, and means for actuating the shoes.

HARVEY C. SWIFT.